W. C. HEDGCOCK.
BRAKE BEAM SAFETY ARRANGEMENT.
APPLICATION FILED JAN. 23, 1922.

1,431,226.

Patented Oct. 10, 1922.

Witness:
G. Burkhardt.

Inventor:
William C. Hedgcock,
By Wilkinson, Huxley, Byron & Knight
Attys.

Patented Oct. 10, 1922.

1,431,226

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-BEAM SAFETY ARRANGEMENT.

Application filed January 23, 1922. Serial No. 531,110.

*To all whom it may concern:*

Be it known that I, WILLIAM C. HEDGCOCK, a citizen of the United States, residing at Chicago, in the county of Cook and State of Illinois, have invented certain new and useful Improvements in a Brake-Beam Safety Arrangement, of which the following is a specification.

This invention relates to brake beam safety arrangements.

One object of the invention is to provide simple, efficient and improved safety means for preventing brake beams from falling to the track in case of failure of some portion of the brake beam or its usual supporting means.

Another object is to provide a simple brake beam safety support designed particularly for use where two brake beams are required per pair of wheels, as in the clasp brake arrangement, and where there is no end rail or tie across the ends of the side frame from which safety supports may be suspended.

A further object is to provide a brake beam safety support which may be easily mounted and dismounted to save time in case it is necessary to take down a brake beam or remove a pair of wheels.

These and other objects are accomplished by means of the arrangement disclosed on the accompanying sheet of drawings, in which—

Figure 1:
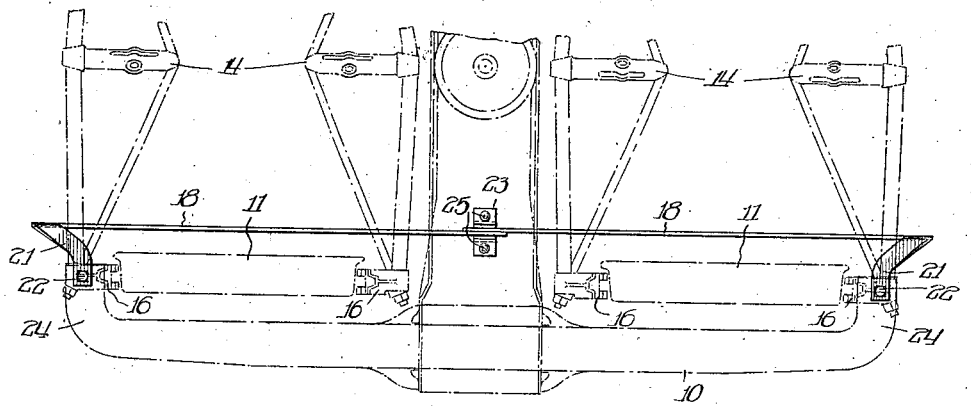
Figure 1 is a fragmentary top plan view of a railway car truck embodying my invention.
Figure 2:
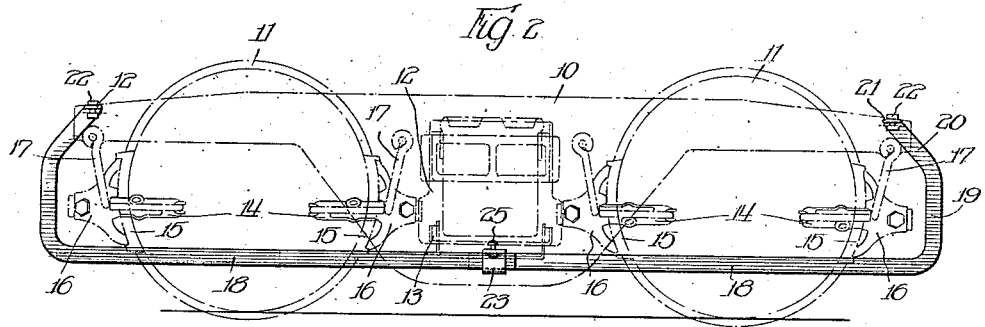
Figure 2 is a fragmentary side elevation of the same arrangement.
Figure 3:
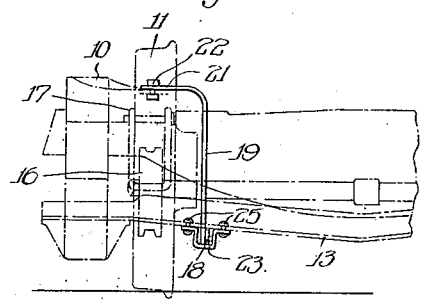
Figure 3 is a fragmentary end elevation of the same railway car truck embodying the invention.

The various novel features of the invention will be apparent from the following description and drawings, and will be particularly pointed out in the appended claims.

Referring to the figures of the drawings, it will be noted that the invention is illustrated in connection with a railway car truck including a side frame 10 carried by truck wheels 11, said side frame having a bolster opening 12 in the bottom portion of which is mounted a spring plank 13 which extends transversely of the truck from side frame to side frame. The drawings disclose the clasp type of brake mechanism in which the brake beams 14 are arranged on opposite sides of a single pair of wheels, said beams being moved toward each other during a braking action, the brake shoes 15 carried by the brake heads 16 at the ends of the brake beams clasping the associated truck wheels 11. The brake beams are suspended and normally held by hangers 17 which, in this particular instance, are suspended from the side frame 10 and connected directly to the brake heads 16. However, it will be understood that so far as this invention is concerned, the brake beams may be supported normally in any suitable manner.

This invention has to do primarily with means for preventing brake beams from falling to the track in the event that such brake beams become detached from their normal supports or hangings. In this connection I have provided means which takes the form of safety bars each of which has a horizontally extending portion 18, a vertically extending portion 19 and portion 20 which extends at an angle upwardly and outwardly with respect to the associated side frame and also has a laterally extending portion 21 which extends transversely outwardly over and is secured to the top of the side frame by any suitable means, such as a bolt and nut arrangement 22 whereby the safety bar is suspended. The outer ends of the safety bars, and more particularly portions 19 and 20 thereof bow longitudinally outwardly around the associated brake beam 14, the portion 18 then extending longitudinally of the truck under the brake beams and out of engagement therewith to the spring plank 13. In this particular instance there is secured to the under side of the spring plank a loop or strap member 23 through which the oppositely extending inner ends of the associated safety bars pass for supporting the inner ends of the latter. Each of the safety bars is made of rectangular relatively flat strip material. It will be noted that the longitudinally extending portion 18 has a greater vertical dimension than transverse horizontal dimension, so that advantage is taken of using a safety bar relatively thin and of considerable depth and sufficient to support the overlying brake beams 14 in the event that the latter become detached from their normal hangings, said safety bars under such circumstances preventing the brake beams from falling to the track. These safety bars extend longitudinally of the truck, inwardly from the truck wheels and in positions which in nowise interfere with the operation of parts or adversely limit clearances. The safety bars are easily applied and withdrawn, thereby greatly facilitating repair in the event that it is necessary to remove the brake beams or a pair of wheels. In this connection it will be noted that the safety bar in each case is applied in position first by passing the inner end thereof into its loop supporting member 23 whereupon the transversely outwardly extending portion 21 may be secured to the side frame. Each of the safety bars is suspended from the side frame and more particularly suspended from inwardly extending end portions 24 of the side frames. To remove a safety bar it is merely necessary to remove the nut and bolt securing mechanism 22 whereupon the inner end of the longitudinally extending portion 18 may be withdrawn from the loop supporting member 23 which is secured by rivets 25 or other suitable means to the underside of the spring plank 13.

It is my intention to cover all modifications of the invention falling within the spirit and scope of the following claims.

I claim:

1. In a railway car truck, the combination of a side frame, a spring plank supported thereby, a brake beam, a safety bar underlying said brake beam to prevent the latter from falling to the track, one end of said safety bar being connected to said side frame, and a member secured to said spring plank for supporting said safety bar.

2. In a railway car truck, the combination of a side frame, a spring plank supported thereby, a brake beam, a safety bar underlying said brake beam to prevent the latter from falling to the track, one end of said safety bar extending vertically and being secured to said side frame, and a loop member secured to the underside of said spring plank for receiving and supporting the other end of said safety bar.

3. In a railway car truck, the combination of a side frame, a brake beam, a safety bar underlying said brake beam to prevent the latter from falling to the track, said safety bar being suspended from said side frame, that portion of the safety bar underlying the brake beam having a greater depth than width for forming a firm support in the event that said brake beam falls thereupon.

4. In a railway car truck, the combination of a side frame, a spring plank supported thereby, brake beams, safety bars underlying said brake beams to prevent the latter from falling to the track, the outer ends of each of said safety bars being secured to the side frames and suspended therefrom and the inner ends of said safety bars extending toward each other and overlapping underneath said spring plank, and means secured to said spring plank for supporting said overlapping inner ends of said safety bars.

Signed at Chicago, Illinois, this 9th day of January, 1922.

WILLIAM C. HEDGCOCK.